Figure 1:
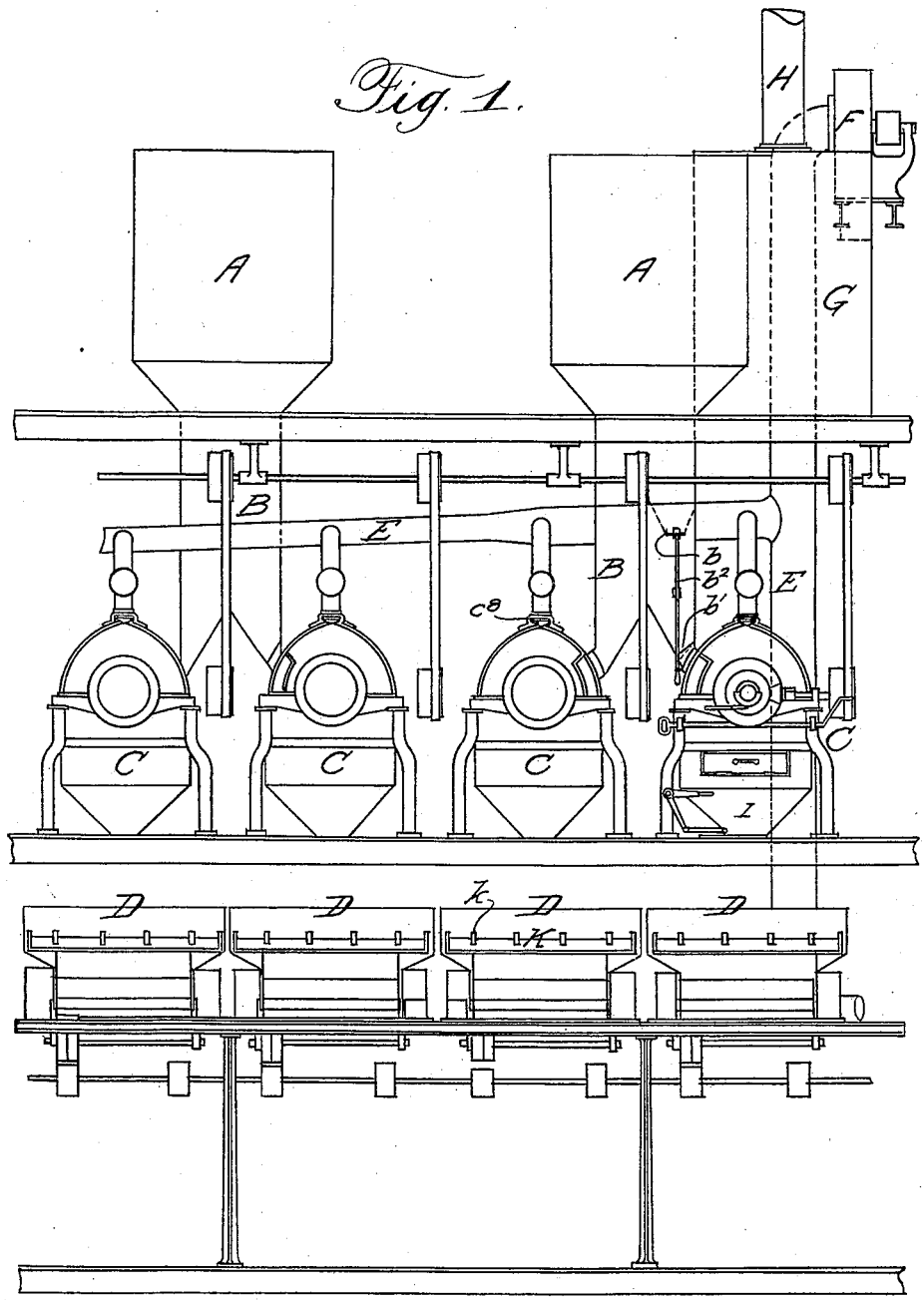

(No Model.) 6 Sheets—Sheet 2.

B. TUPHOLME.
APPARATUS FOR ROASTING COFFEE.

No. 591,307. Patented Oct. 5, 1897.

Witnesses:—
H. K. Boulter
E. G. Northup

Inventor:—
Beeston Tupholme
By Wm. E. Boulter,
Attorney (No Model.) 6 Sheets—Sheet 3.

B. TUPHOLME.
APPARATUS FOR ROASTING COFFEE.

No. 591,307. Patented Oct. 5, 1897.

(No Model.)  6 Sheets—Sheet 4.

B. TUPHOLME.
APPARATUS FOR ROASTING COFFEE.

No. 591,307.  Patented Oct. 5, 1897.

Witnesses:  Inventor:

(No Model.) 6 Sheets—Sheet 5.

B. TUPHOLME.
APPARATUS FOR ROASTING COFFEE.

No. 591,307. Patented Oct. 5, 1897.

Witnesses:
H. K. Boulter
P. Shorthup

Inventor:
Beston Tupholme
By Wm. D. Boulter,
Attorney (No Model.) 6 Sheets—Sheet 6.
B. TUPHOLME.
APPARATUS FOR ROASTING COFFEE.
No. 591,307. Patented Oct. 5, 1897.
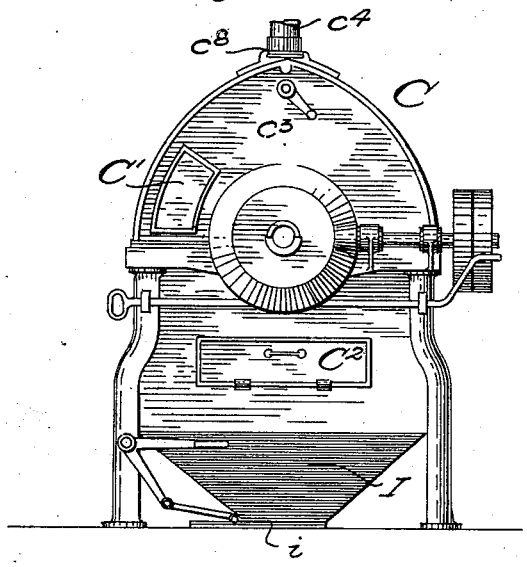
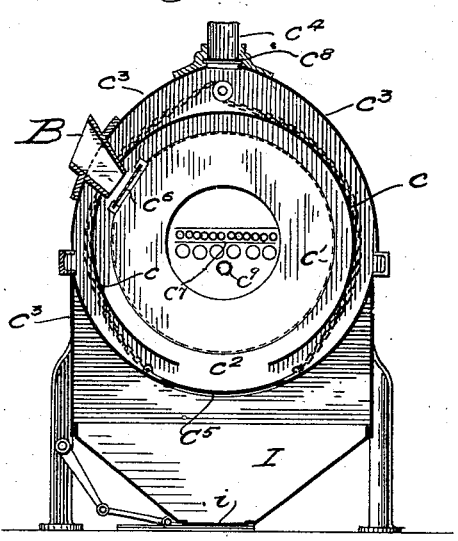
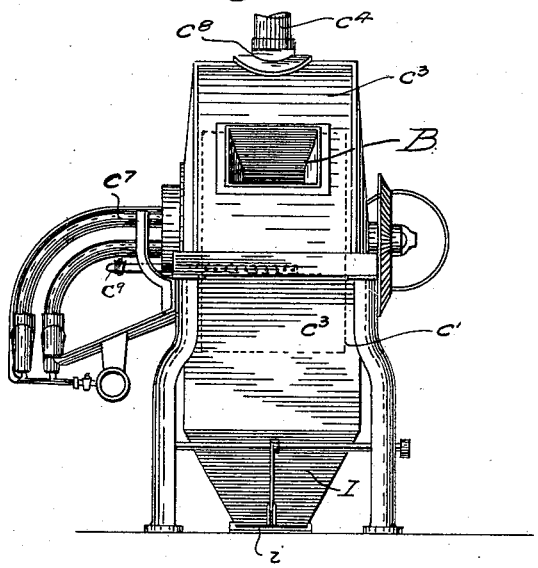

UNITED STATES PATENT OFFICE.

BEESTON TUPHOLME, OF LONDON, ENGLAND, ASSIGNOR TO JOSEPH BAKER & SONS, OF SAME PLACE.

APPARATUS FOR ROASTING COFFEE.

SPECIFICATION forming part of Letters Patent No. 591,307, dated October 5, 1897.

Application filed November 21, 1895. Serial No. 569,698. (No model.)

*To all whom it may concern:*

Be it known that I, BEESTON TUPHOLME, a subject of the Queen of Great Britain, residing at London, England, have invented certain new and useful Improvements in Apparatus for Roasting Coffee; and I declare the following to be a full, clear, and exact description of the invention, such as will enable others skilled in the art to which it appertains to make and use the same.

My invention relates to improvements in apparatus for treating coffee and similar substances, and comprises in its complete form hoppers or receptacles for the raw coffee, chutes to convey it to the roasters, roasters, coolers, chaff-arresters, receptacles for receiving the roasted berries, together with air-pipes, shafting, and other accessories.

The various portions of the present invention may be used together as a complete apparatus, or any one or more may be used in combination with other forms.

Among the objects in view is to provide simple, inexpensive, and readily-operated apparatus whereby coffee or similar substances may be quickly roasted and cooled; and the invention consists in the novel construction, arrangement, and combination of parts, as hereinafter fully described, illustrated in the drawings, and pointed out in the appended claims.

Figure 2:
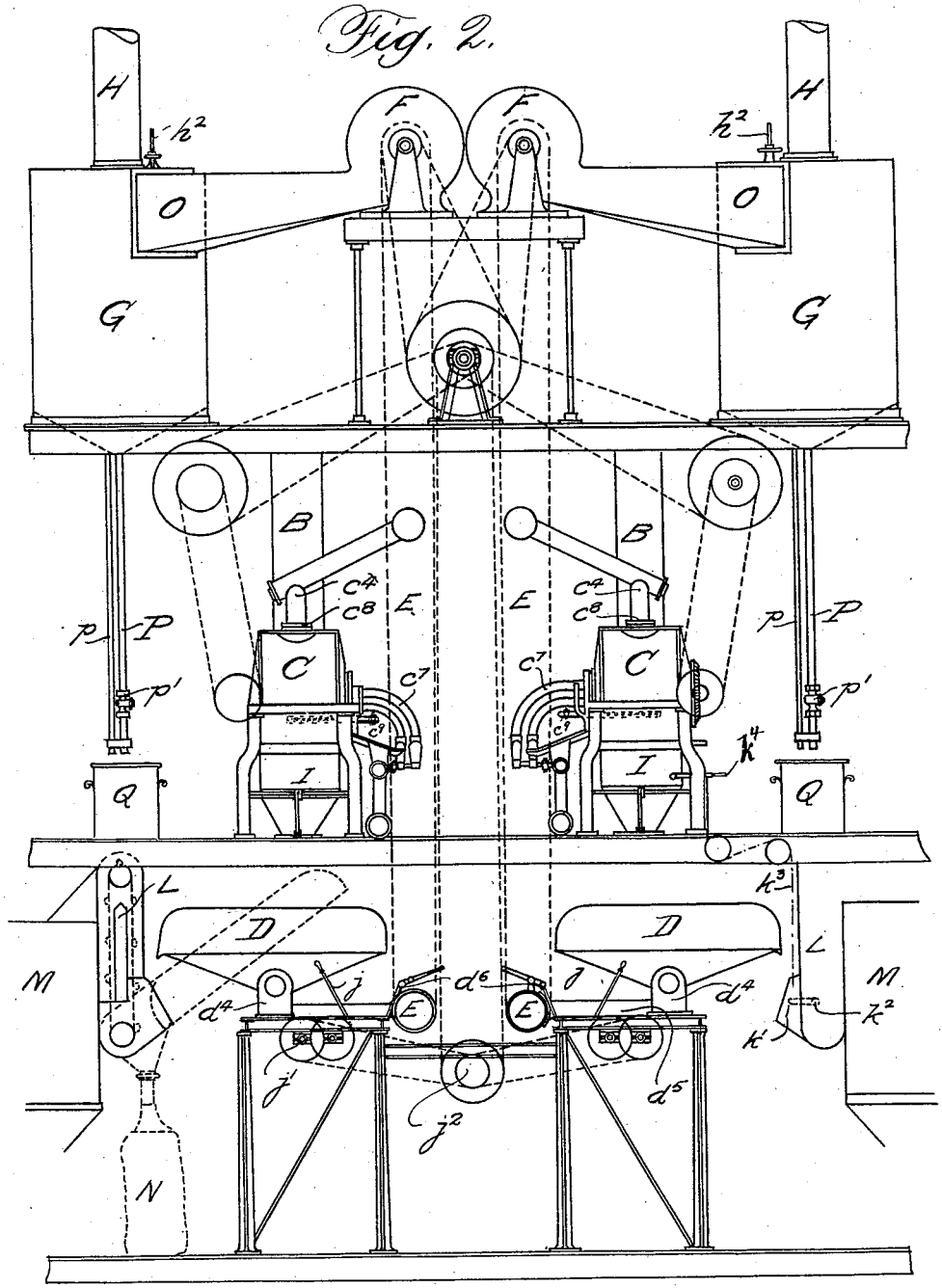
Figure 3:
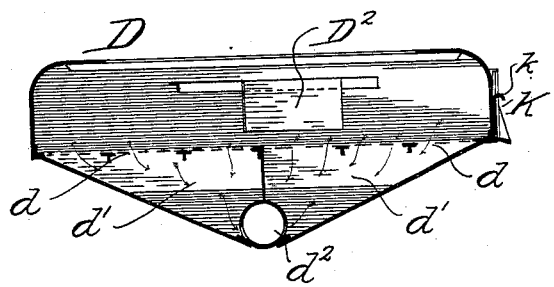
Figure 4:
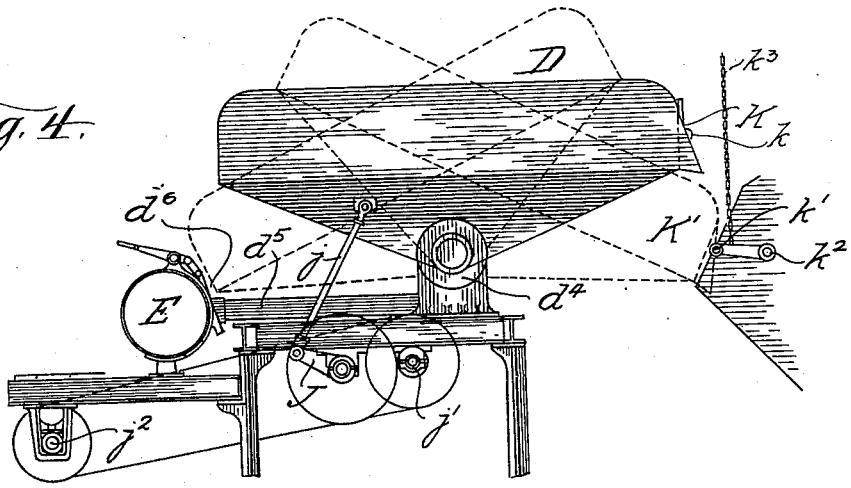
Figure 5:
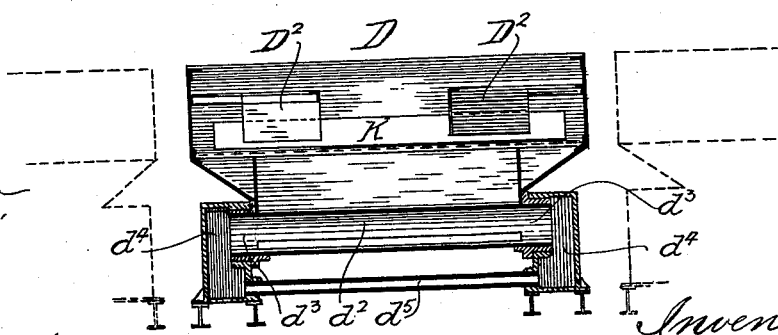
Figure 6:
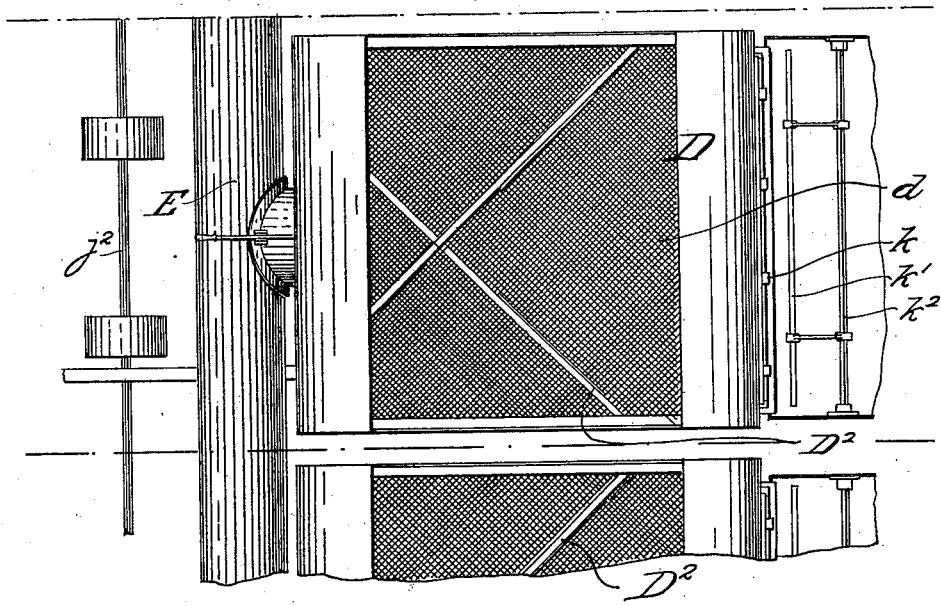
Figure 7:
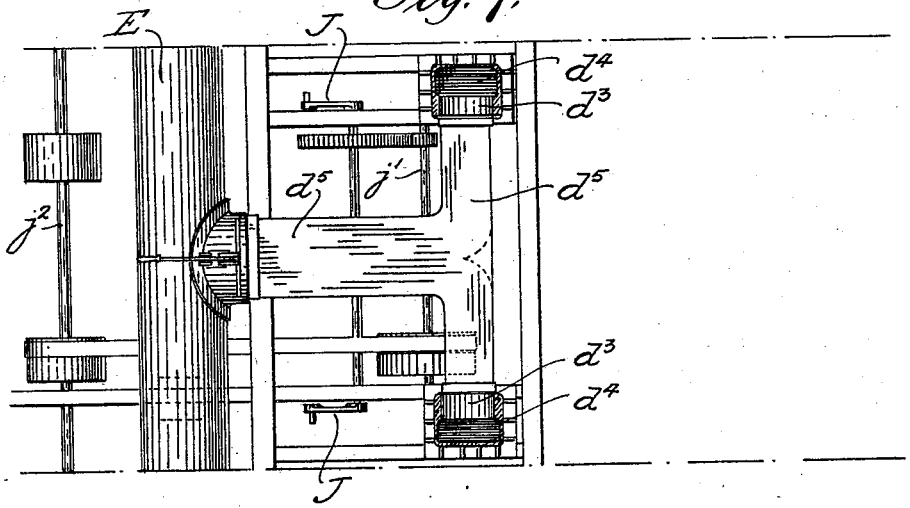
Figure 8:
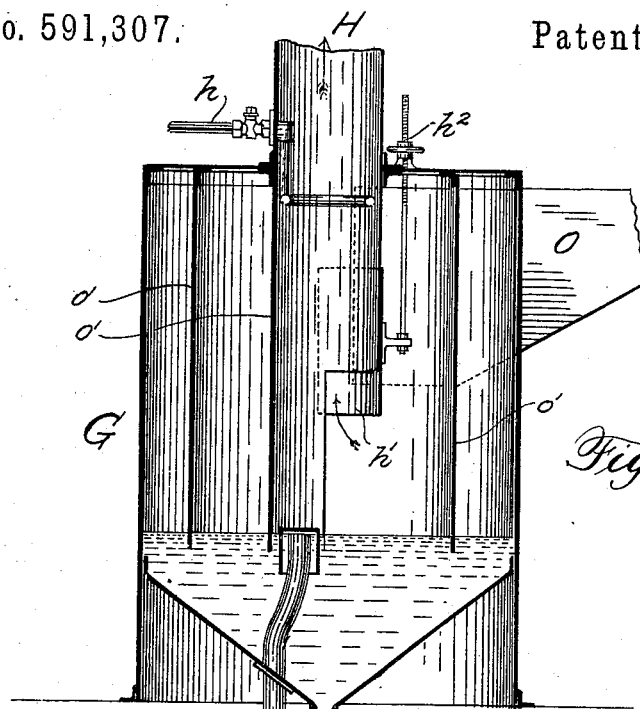
Figure 9:
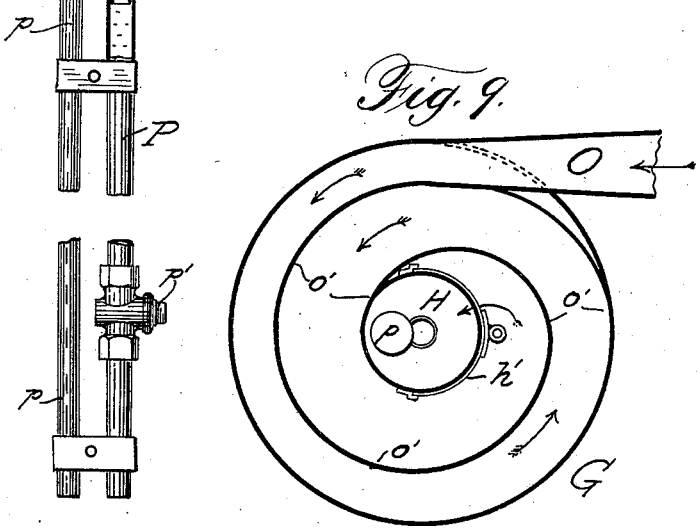

In the drawings, Figures 1 and 2 show the complete apparatus in front and side elevation, respectively. Fig. 3 is a vertical section of the cooler; Fig. 4, an elevation thereof, showing the operating means. Fig. 5 is a longitudinal sectional view. Fig. 6 is a plan view. Fig. 7 is an underside view, the cooler being removed. Fig. 8 is a vertical sectional view of the chaff-arrester. Fig. 9 is a horizontal sectional view of the same. Fig. 10 is a front elevation of the roaster. Fig. 11 is a vertical sectional view thereof, the roasting-drum being in elevation. Fig. 12 is an end view.

In Figs. 1 and 2 I have shown two sets of four roasters each, with the accompanying coolers, &c. The raw berries are placed in the hoppers A, from which they pass by the chutes B to the roasters C. The roasted berries pass from the lower part of the roasters to the coolers D and thence to bins, sacks, or other receptacles.

E E are the air-pipes conveying the fumes from the roasters and the induced air from the cooler to fans F, which deliver them to the chaff or flight arresters G. The solid particles are here arrested, while the uncondensed gaseous substances pass up the waste-pipe H.

The hoppers A may be of any desired shape and capacity, or they may be omitted.

The chutes B preferably have a dividing diaphragm and door $b$, operated by the lever $b^2$ of the charging-door $b'$. The space between these doors is proportioned to hold a roasting charge, and the doors themselves and lever being so arranged that the act of closing one door opens the other.

The roasters C may be of any known construction, but are preferably similar in construction to the roaster shown and described in British Letters Patent No. 4,970, of 1887; but in the present case I economize the heat by a middle additional partition or baffle-plate $c$, which causes the heat passing through the perforated revolving cylinder $c'$, containing the berries, to pass around $c'$ to an opening at $c^2$ at or near the bottom, from whence it escapes between the partition $c$ and the outer casing $c^3$ to the waste-pipe $c^4$. Doors $c^5$, operated as shown or by any other means and in any other manner, are closed during the operation of roasting, but open to allow the roasted coffee to pass into the receptacle I. The revolving perforated cylinder $c'$ is charged and discharged through a sliding door $c^6$, operated through doors $C'$ and $C^2$ in the outer casing.

The gas-burners for heating are shown at $c^7$ and the charging-hopper at B. The gas-burners are similar to those shown in my aforesaid British patent, having such construction as to permit air to be admitted to and mixed with the gas before being burned at the burner-tip, whereby I secure a hot blue flame and smokeless.

In the arrangement shown in the drawings a number of roasters are connected to a fan F by air-pipes having dampers or valves $c^8$, Fig. 11, by which one or more may be shut off at will, but I may use in some cases a small fan arranged on the top or other part of the roaster. The fans are used principally for the purpose of drawing off the fumes, &c., thrown off during the roasting and delivering them to the chaff-arrester G. The lower portion of this roaster (shown in Figs. 10, 11, and 12) is formed into a hopper I with discharging-door $i$.

In the roasting of coffee, and especially the cheaper grades thereof, I have found that it is desirable and advantageous to effect a preliminary or partial cooling of the coffee before discharging it from the roasting-drum into the usual coolers located at some point exteriorly of the drum, so that shrinkage and an uneven appearance of the roasted berries will be avoided, and for this purpose I provide a pipe $c^9$, which may communicate at one end with a suitable source of water or other liquid supply and at the opposite end leading into the roasting-drum at a point preferably adjacent to the axial center thereof, and being perforated so as to project a series of liquid jets onto the roasted berries while still in the roasting-drum, the gas-flame having in the meantime been cut off.

Instead of using water or other liquid as a cooling medium steam might be used, though I prefer the former. I would state, however, that the preliminary cooling may be dispensed with, if desired.

D indicates the coolers which I employ for effecting the final cooling of the roasted berries. Each of these coolers D is preferably of rectangular shape, having a perforated bottom $d$, upon which the roasted berries are placed and through which the air passes into inner chambers $d'$, opening into a pipe $d^2$, trunnioned at $d^3$ in fixed hollow pedestals $d^4$. These pedestals serve to support the cooler and also to open a communication with the air-pipe E by means of passages $d^5$ and valve or door $d^6$. The cooler is rocked or oscillated into the positions shown in dotted lines in Fig. 4 by connecting-rod $j$ and cranks J, driven by a counter-shaft $j'$, receiving motion from the main shaft $j^2$. At one end of the cooler is formed a discharging-door K, sliding vertically in suitable guides and operated in any suitable manner.

In the arrangement shown in Figs. 2, 4, and 6 the door has hooks or handles $k$, which may be operated when the cooler is in the extreme position shown at K', Fig. 4, by a bar $k'$, carried at the end of levers mounted on the rocking shaft $k^2$ and operated by a chain $k^3$ and handle $k^4$, Fig. 2.

The door K may open into the chute of an elevator L, Fig. 2, discharging into a bin M or an automatic weigher, or it may open into a small hopper for filling sacks, as at N, or otherwise.

I may in some cases use other forms of coolers more or less in common use and fit them with a perforated bottom and means for drawing air through to expedite drying.

In Figs. 3, 5, and 6 I have shown vanes or partitions $D^2$, which serve to mix or turn over the coffee-beans during the cooling. These may, however, be omitted, if desired.

The chaff or flight arrester is shown in Figs. 8 and 9. It is constructed, preferably, as a cylindrical vessel having a tangential inlet O and a spiral or volute partition $o'$, terminating in the waste-pipe H. The lower ends of the partition $o'$ dip into water contained in the lower part of the vessel. The chaff "flight" and other waste products enter at O and whirl around inside the spiral until they fall into the water below, while the induced current of air is blown or drawn up the waste-pipe H. The velocity of the entrance at O and size of the spiral passage are proportioned so that the solid particles are all thrown down before the gases escape at H. A pipe $h$ supplies water and also damps the walls of the said waste-pipe H. The outlet is controlled by a vertically-sliding door or flap $h'$, with screw and hand-wheel $h^2$. The solid particles as they accumulate in the lower part of the arrester may be drawn off by a pipe P and cock $p'$ into a pail Q, having a perforated bottom, or other receptacle. A pipe $p$ carries away any surplus water.

I would state that my treatment of coffee-berries hereinbefore described—that is to say, the initial step of subjecting the berries to the roasting heat produced by a gas-flame and the subsequent step of introducing water to act upon the berries after the gas-flame has been cut off, whereby the water will be enabled to act upon the berries while not subjected to the action of the gas-flame—is important.

Owing to the fact that in my treatment the gas-flame is cut off from the berries before the water is brought into contact with the berries said water will be enabled to act more uniformly upon the berries, and at the same time the cooling of the berries will be effected in a much shorter time than could be effected were the gas-flame not cut off from contact with the berries.

What I claim, and desire to secure by Letters Patent, is—

1. In an apparatus of the character described, the combination of a roasting-machine, a cooler into which the roasted berries are discharged, a chaff-arrester, and means for conveying the fumes from the roaster and induced air from the cooler and delivering them into the chaff-arrester, all as set forth.

2. In an apparatus of the character described, a cooler having a perforated bottom, a perforated pipe in communication with the interior of the cooler and extending transversely thereof within the same, fixed supports in which said pipe is pivotally mounted, said pipe thus forming pivots for the cooler, means for rocking or oscillating the cooler on its pivots and a fan in communication with the said pipe.

3. In an apparatus of the character described, a cooler having a perforated bottom and chambers beneath said bottom as described, a perforated pipe arranged to communicate with said chambers and extending beyond the cooler at each end, hollow supports in which the ends of the pipe are journaled, conduits in communication with the interior of said supports, and an air-pipe in communication with the said conduits, and a fan adapted to create a current of air through the cooler and the pipes, as set forth.

4. In an apparatus of the character described, the combination with the roasting-drum, a hollow trunnion thereon, a burner-pipe arranged within said hollow trunnion, and a pipe adapted to conduct a cooling medium into the interior of the drum arranged within said trunnion adjacent to the burner-pipe.

5. In an apparatus of the character described, the flight-arrester consisting in the combination with a vessel having a tangential inlet, a volute partition in said vessel, forming a volute passage, a waste-pipe communicating with the inner end of said passage, a body of water contained within the vessel and into which water the lower end of said partition dips, an outlet at the inner end of the waste-pipe, and a door or flap controlling said outlet and means for operating said door or flap, as specified.

6. In an apparatus of the character described, a cooler adapted to be oscillated and vanes or blades arranged within said cooler for the purpose set forth.

7. In an apparatus of the character described, the combination with the roasting-drum, an inclosing casing therefor, and an exhaust-pipe communicating with the interior of said casing, of a baffle-plate arranged between the roasting-drum and the casing and surrounding said drum, said baffle-plate being provided at or near its bottom with an opening, as set forth.

8. In an apparatus of the character described, the cooler adapted to be oscillated and a discharging-door for said cooler at one side thereof, in combination with a lever adapted to operate the door of the cooler when the latter is in a tilted position, a chain connected with the lever to cause it to operate the door, and an operating-handle for said chain, as set forth.

In testimony whereof I affix my signature in presence of two witnesses.

BEESTON TUPHOLME.

Witnesses:
A. STEAD,
T. SMITH.